United States Patent [19]

Faber

[11] Patent Number: 5,058,946

[45] Date of Patent: Oct. 22, 1991

[54] HINGED TRAILER AND BOAT COVER

[76] Inventor: Robert G. Faber, Rte. 1, Arkansas City, Kans. 67005

[21] Appl. No.: 372,920

[22] Filed: Jun. 29, 1989

[51] Int. Cl.⁵ .......................... B60P 7/02; B60P 3/10
[52] U.S. Cl. .................... 296/181; 296/100; 280/414.1; 114/361; 74/99 R; 49/254; 16/360; 16/361; 16/389; 16/392
[58] Field of Search ............... 296/181, 100, 27, 172, 296/173; 114/344, 361; 280/414.1; 16/360, 361, 389, 390, 391, 392; 49/254, 257, 258; 403/116; 74/99 R, 104, 105; 220/331

[56] References Cited

U.S. PATENT DOCUMENTS

| | | | |
|---|---|---|---|
| 540,646 | 6/1895 | Deming | 16/392 |
| 590,860 | 9/1897 | Rowe | 16/390 |
| 1,352,379 | 9/1920 | Pounder | 16/361 |
| 2,032,221 | 2/1936 | Myers | 49/254 X |
| 3,065,496 | 11/1962 | Loughlin | 16/390 |
| 3,077,630 | 2/1963 | Lipman | 16/390 X |
| 3,704,039 | 11/1972 | Dean | 296/100 |
| 3,970,203 | 7/1976 | Watson, Jr. | 296/181 X |
| 4,043,569 | 8/1977 | Ratliff | 296/181 X |
| 4,223,414 | 9/1980 | Dickson | 114/361 |
| 4,271,711 | 6/1981 | Vavra | 74/99 R |
| 4,357,047 | 11/1982 | Katz | 296/181 |
| 4,533,171 | 8/1985 | Lake | 296/27 X |
| 4,579,382 | 4/1986 | Lake | 296/181 |
| 4,664,401 | 5/1987 | Carrick | 114/344 X |

Primary Examiner—Margaret A. Focarino
Assistant Examiner—Andrew C. Pike
Attorney, Agent, or Firm—Litman, McMahon & Brown

[57] ABSTRACT

A hinged cover is provided for mounting on a trailer including a front end, a back end and opposite sides. The cover includes a body with a front end, a back end and opposite sides. A hinged assembly hingedly interconnects the trailer and the cover body at the front ends. The cover is movable between raised and lowered positions by a pair of jack assemblies interconnecting the trailer and the cover at their sides. The hinged assembly includes a lost motion linkage comprising a generally vertical slot into which a hinge pin is slidably received. The hinge pin slides upward in the slot as the cover is raised and downward as the cover is lowered. The cover also includes a pair of supports onto which the cover may be seated when in the raised position thereof. A pair of supports are mounted on the trailer and each includes a bifurcated upper end. The cover has a lower rim which is received in the support upper ends with the cover in its lowered position. A pair of fasteners attach the cover to the support upper ends with the cover in its lowered position.

4 Claims, 2 Drawing Sheets

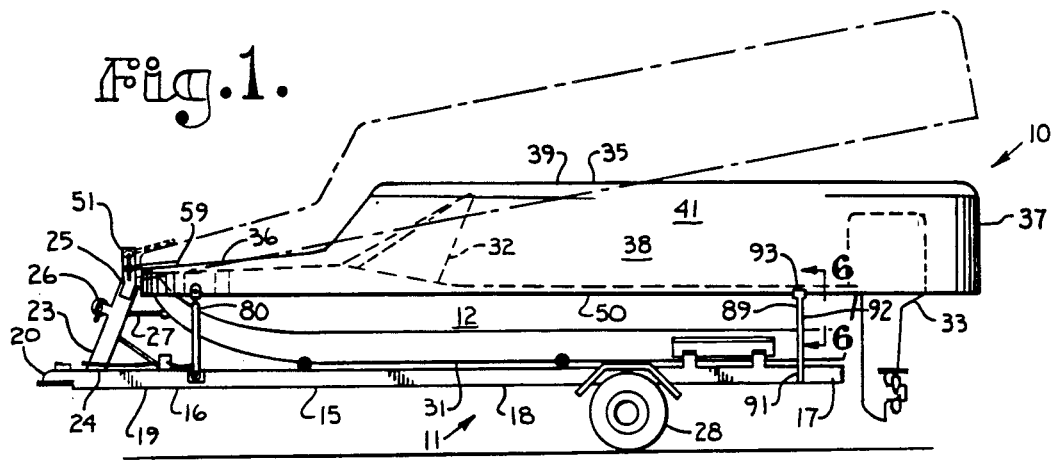
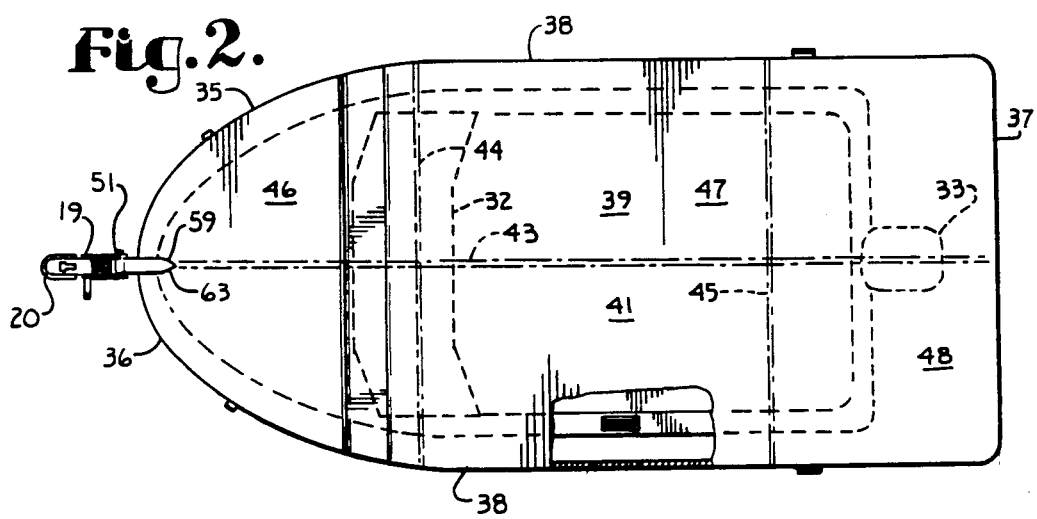
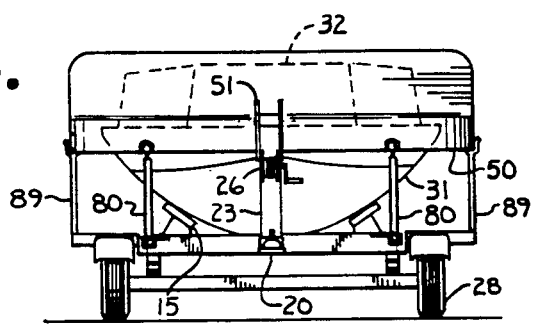

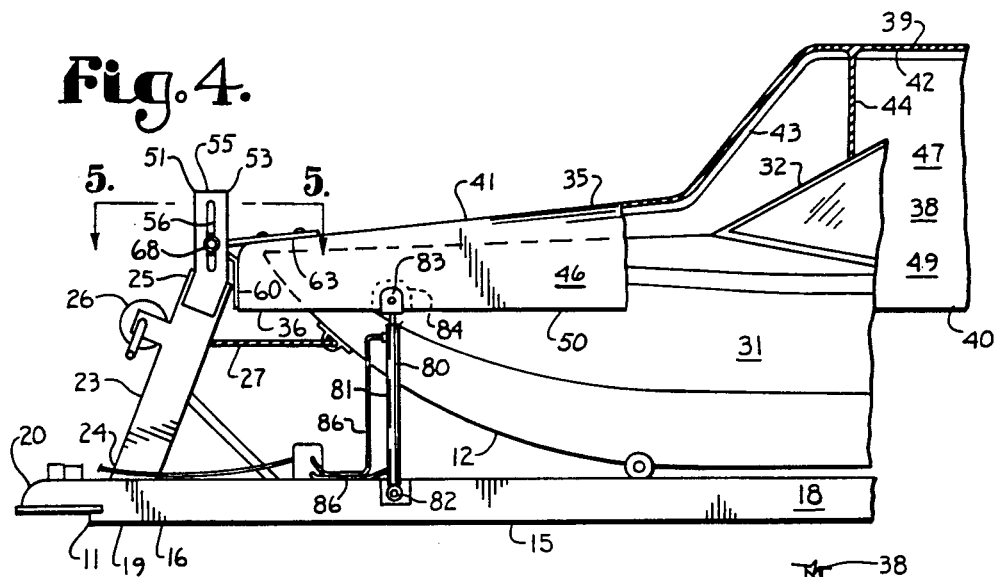

HINGED TRAILER AND BOAT COVER

BACKGROUND OF THE INVENTION

1. Field of the Invention

The present invention relates generally to protective covers, more particularly to trailer covers and specifically to a hinged cover for a boat and trailer.

2. Description of the Prior Art

Devices for covering and protecting are well known and a variety of different types have heretofore been developed. For example, flexible or "soft" covers can be made from fabric, plastic film and various other materials. They are often provided with devices for securing them such as snaps, tie-down fasteners, grommet holes, etc.

Flexible covers have the advantage of generally being able to conform to various configurations of articles to be protected. For instance, boat covers are often custom-tailored from weather-resistant flexible materials. Since boats vary so widely in configuration and size, a correspondingly wide variety of covers are available.

A disadvantage with flexible covers is that they must be relatively well-secured in order to provide effective protection from the elements. Otherwise, they may be lifted, ripped or even completely torn off by the wind. Another disadvantage is that depressions are often formed in flexible covers which collect water. To avoid such depressions, flexible covers are often supported from underneath or, in the case of certain types of boats such as sailboats, suspended from the rigging. Such depressions tend to become heavier as they collect more water and thereby subject the cover to considerable stress. Such water-filled depressions are a major cause of boat cover failure.

Another problem with flexible covers is that they tend to flutter in response to air movement, which can harm the finish of the covered article. The problems associated with frictional contact between a boat and its flexible cover are often exacerbated when the covered boat is transported, for example by towing on a trailer. A long highway trip with a boat protected only by a flexible fabric cover can be highly injurious to the boat's finish.

A further disadvantage with flexible covers is that they provide little security for boats and their contents. Since flexible covers can normally be easily removed or slit open, equipment, such as fishing gear and tackle, left in a boat under a flexible cover is highly vulnerable to theft and vandalism.

Boats are often stored and transported without any protective covering whatsoever. However, prolonged exposure to the elements is injurious to most boat finishes. For example, ultraviolet solar radiation can degrade fiberglass, fade the finish color pigmentation and cause other damage. Exposure to the elements can lead to oxidation of a finish, and thereby reduce its luster. Furthermore, some marine equipment can be damaged by prolonged exposure to moisture.

Rigid or "hard" covers might avoid or at least reduce the effects of some of the aforementioned disadvantages associated with flexible covers. However, handling a single-piece rigid cover, especially a large one, can be relatively difficult.

The aforementioned problems are addressed by the hinged cover of the present invention.

SUMMARY OF THE INVENTION

In the practice of the present invention, a hinged cover is provided for mounting on a trailer including a front end, a back end and opposite sides. The cover includes a body with a front end, a back end and opposite sides. A hinge assembly hingedly innerconnects the trailer and the cover body at their front ends. A pair of jack assemblies innerconnect respective trailer frame and cover sides. The jack assemblies are adapted for raising and lowering the cover body between raised and lowered positions. A pair of supports are mounted on the trailer frame sides adjacent to its back end and partially support the cover in its lowered position.

Heretofore there has not been available a hinged cover with the advantages and features of the present invention.

OBJECTS AND ADVANTAGES OF THE INVENTION

The principle objects and advantages of the present invention include: providing a hinged cover; providing such a cover for a trailer; providing such a cover for a boat trailer; providing such a cover which is adapted for raising and lowering between raised and lowered positions; providing such a cover with a rigid body; providing such a cover which effectively protects an object on the trailer from the elements; providing such a cover which may be positioned in covering relation but out of contact with an object on the trailer; providing such a cover which can be produced in various configurations to conform to different objects; providing such a cover which is particularly well adapted for a boat trailer; providing such a cover which may be raised and lowered between a raised position for launching and recovering a boat and a lowered position for transport and storage; and providing such a cover which is adapted for securing a boat and its contents against theft and vandalism.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a hinged cover embodying the present invention, shown mounted on a boat trailer.

FIG. 2 is a top plan view of the hinged cover.

FIG. 3 is a front elevational view of the hinged cover.

FIG. 4 is a fragmentary, side elevational view of the hinged cover with portions broken away to reveal internal construction.

FIG. 5 is a fragmentary, horizontal, cross-sectional view of the hinged cover taken generally along line 5—5 in FIG. 4 and particularly showing a hinge assembly.

FIG. 6 is a fragmentary, vertical, cross-sectional view of the hinged cover taken generally along line 6—6 in FIG. 1 and particularly showing a support.

FIG. 7 is a fragmentary, side elevational view particularly showing the hinge assembly and a jack assembly.

FIG. 8 is a fragmentary, vertical, cross-sectional view of a hinged cover with inner and outer cover body shells mounted on a structural framework and comprising a first modified embodiment of the present invention.

DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Without limitation, directional terms used herein refer to invention as oriented in FIG. 1, with the front being to the left and the back being to the right.

Referring to the drawings in more detail, the reference numeral 10 generally designates a hinged cover embodying the present invention. The cover 10 is shown mounted on a trailer 11 for a boat 12. However, it will be appreciated that the hinged cover of the present invention may be mounted on a variety of base structures and may be utilized to cover and protect a variety of objects. For example, trailers are used to transport a variety of objects that could be covered and protected by the hinged cover of the present invention, including automobiles, motorcycles and construction equipment, to name a few. Likewise, the marine applications of the present invention are not limited to trailers. For example, hinged covers embodying the present invention could be mounted on floating docks whereat boats are moored to protect them during periods of nonuse.

The trailer 11 includes a frame 15 with front and back ends 16, 17 and opposite sides 18. A tongue 19 is located at the trailer frame front end 16 and mounts a trailer hitch 20. Also mounted on the tongue 19 at the trailer frame front end 16 is a winch post 23 with a lower end 24 mounted on the trailer frame front end 16 and an upper end 25 mounting a winch 26. A flexible line 27, which may comprise a rope or cable, is wound on the winch 26 and may be attached to the front end of the boat 12 as shown. A transversely-extending wheel carriage 28 is mounted on the frame sides 18 and may be located in a rear part of the trailer frame 15 as shown.

The boat 12 may include a hull 31, a windshield 32 and an outboard motor 33.

II. Hinged Cover

The hinged cover 10 includes a body 35 with a front end 36, a back end 37 and opposite sides 38. The body 35 may be formed monolithically from plastic, fiberglass, sheet metal, etc. The configuration of the body 35 is generally upwardly-convex with a convex upper, outer surface 41 and a concave lower, inner surface 42. The body 35 includes a generally convex top 39, a generally concave bottom 40 whereby a downwardly-open body interior 49 is defined, and a lower edge 50. A longitudinal stiffening stringer 43 and front and back transverse ribs 44, 45 may be formed integrally with the body 35 and project downwardly from its lower surface 42, dividing the body 35 into front, middle and back sections 46, 47 and 48 respectively; each section comprising two sides demarcated by the longitudinal stringer 43.

A combination hinge/lost motion assembly 51 pivotably and slidably interconnects the trailer frame front end 16 and the cover body front end 36. The hinge/lost motion assembly 51 includes a pair of vertically-oriented hinge plates 53 positioned in parallel, spaced relation with respect to each other and each having a proximate, lower section 54 mounted on a respective side of the winch post 23 at its upper end 25 and a distal, upper section 55 projecting upwardly from the winch post upper end 25. The hinge plate proximate section 54 slopes rearwardly from bottom-to-top and the distal section 55 extends generally vertically upwardly therefrom, whereby an obtuse angle is formed between the hinge plate sections, 54, 55. Each hinge plate upper section 55 includes a vertical hinge pin slot 56 with upper and lower ends 57, 58.

The hinge/lost motion assembly 51 further includes a cover body attachment strap or bracket 59 with a front hinge strap or leg 60 including proximate and distal sections 61, 62 forming an obtuse, dihedral angle with respect to each other. The bracket 59 also includes a top hinge strap or leg 63 with proximate and distal sections 64, 65. The bracket legs 60, 63 are connected at their distal sections 62, 65 to a hinge sleeve 67, which extends transversely between the hinge plates 53 in alignment with their slots 56 and is in spaced relation from the cover body front end 36. The hinge sleeve 67 pivotably receives a hinge pin 68 having opposite ends, which may comprise a bolt which is slidably and rotatably received in the slots 56 and which is secured in the hinge plates 53 and the hinge sleeve 67 by washers 69 and a lock nut 70.

At its front end 36, the body 35 includes a thickened, front reinforcing area 73, which may be formed integrally and in alignment with the body stringer 43 and which may have a configuration roughly corresponding to the configurations of the bracket leg proximate sections 61, 64. The bracket 59 is attached to the body front end 36 by mechanical fasteners 74, which may comprise bolts, extending through the bracket proximate sections 61, 64 and the reinforcing area 73.

A pair of jack assemblies 80 each includes a piston-and-cylinder unit 81 with a lower end 82 mounted on a trailer frame side 18 and an upper end 83 pivotally connected to a side 38 of the cover body 35 in proximity to the body lower edge 50. The body 50 includes a pair of thickened, side reinforcing areas 84 whereat the piston-and-cylinder unit upper ends 83 attach to the body 35. The piston-and-cylinder units 81 may be connected to a source of pressurized fluid (not shown) by fluid lines 86.

The piston-and-cylinder units 81 may be either pneumatic or hydraulic. Alternatively, a variety of other types of linear actuators could be successfully employed with the hinged cover of the present invention. For example, linear actuators with screw-threaded rods actuated by electric motors are available and might be used with the jack assembly 80. Also, various hand-powered actuating units could be employed.

A pair of supports 89 are provided for selectively supporting the cover body back end 37 on the trailer frame back end 17. Each support 89 includes a vertical support column 90 with a lower end 91 mounted on the trailer frame side 18 and a bifurcated upper end 92 mounting a notch or U-bracket 93. The U-bracket 93 includes a pair of downwardly-coverging legs 94 integrally connected to a bottom connecting section 95, which is attached to the column upper end 92, for example by welding. A pair of transversely-aligned receivers 98 extend through each pair of U-bracket legs 94.

The cover body 35 includes a pair of thickened, rear reinforcing areas 96, each located at a respective side 38 adjacent to the body lower edge 50. Each reinforcing area 96 includes a receiver 97 which aligns with a respective pair of U-bracket receivers 98 when the cover 10 is in its lowered position as shown in solid lines in FIG. 1.

The aligned receivers 97, 98 are adapted to receive locking pins 101, which may be secured in place by cotter keys 102. A variety of other types of mechanical fasteners and locking pins could be used in place of those shown at 101.

The cover body upper surface 41 may be treated for greater resistance to the elements, for example with a gel coat or by painting. Furthermore, the selection of relatively light-colored materials for the cover body 35 may minimize the degrading effects of sunlight.

III. Operation

In operation, the cover 10 is movable between a lowered position (solid lines in FIG. 1) and a raised position (broken lines in FIG. 1). In its lowered position, the cover 10 substantially covers the top and parts of the sides of the boat 12, which is partly positioned within the cover body interior 49. With the cover 10 in its lowered position, the body 35 is secured in place by inserting the locking pins 101 through the aligned U-bracket receivers 98 and the receivers 97 in the cover rear reinforcing areas 96. The locking pins 101 are secured in place by the cotter keys 102.

With the cover 10 in its lowered position, the piston-and-cylinder unit 81 may be fully retracted. Furthermore, fluid pressure or some other retaining means may be employed to retain the piston-and-cylinder unit 81 in its retracted position to restrain the cover body front end 36 against uplift, which might be encountered when the cover 10 is subjected to relatively strong air movement thereacross. Such air movement might be encountered while transporting the cover, trailer and boat 10, 11 and 12, or in connection with a heavy wind.

With the cover 10 in its lowered position, the hinge pin 68 is located at the lower ends 58 of the hinge plate slots 56. In its lowered position, the cover 10 provides substantial protection for both the boat 12 and the trailer 11 from the elements. Thus, the boat 12 will generally be unaffected by sunlight and precipitation. Furthermore, secret combination or keyed locking devices may be used in place of the locking pins 101 whereby the cover 10 would be locked in place on the supports 89. With the cover 10 thus locked in its lowered position, the boat 12 would be difficult to remove from the trailer 11.

For removal of the boat 12 from the trailer 11, the cover 10 is raised to a raised position as indicated by broken lines in FIG. 1. The locking pins 101 are removed from their receivers 97, 98 and the jack assemblies 80 are actuated whereby the piston-and-cylinder units 81 extend. Extending the piston-and-cylinder units 81 has the effect of first raising the cover body front end 36 until the hinge pin 68 engages the slot upper ends 57 while the cover 10 pivots slightly about an axis extending through the locking pin receivers 97, 98. Upon reaching the upper limit of its travel at the hinge pin slot upper ends 57, the hinge pin 68 defines a transverse pivotal axis about which the cover 10 pivots as the piston-and-cylinder units 81 continue to extend so that the cover 36 slopes upwardly from front-to-back. The cover body back end 37 is thus raised substantially above the trailer frame back end 17 to a sufficient height for the boat windshield and motor 32, 33 to pass beneath the cover back end 37. With the cover 10 in its raised position, the boat 12 may easily be launched or retrieved, for example at a launching ramp. Furthermore, access to the boat 12 may be obtained by raising the cover 10.

IV. Alternative Embodiment

A hinged cover 110 comprising a first modified embodiment of the present invention is shown in FIG. 8 and comprises a structural framework 111, which may assume the configuration of the reinforcing stringer 43 and ribs 44, 45 of the cover 10 described above. The framework 111 includes an I-member 112 with inner and outer flanges 113, 114 interconnected by a web 115. Each flange 113, 114 includes a longitudinally extending screw slot 116 open thereat. The cover 110 includes inner panels 119 which are placed against the inner flange 113 and secured by an inner fastening strip 120 for covering an inner gap 121 between the inner panels 119. Outer panels 123 are mounted on the outer flange 114 by an outer fastening strip 124 which is adapted for covering an outer gap 125. The inner and outer fastening strips 120, 124 are secured in place with the panels 119, 123 clamped tightly against the flanges 113, 114 by mechanical fasteners 127, which may comprise screws received in the screw slots 116.

The cover 110 derives strength from the framework 111 mounting the spaced-apart inner and outer panels 119, 123 which in effect form inner and outer shells 128, 129. With a composite construction of this nature, the individual panels 119, 123 may be relatively thin. Furthermore, the panels 119, 123 may be selected from different materials for certain advantages, such as resistence to the elements and strength. For example, the outer panels 123 may comprise plastic which is resistent to the degrading effects of sunlight, whereas the inner panels 119 may comprise relatively strong fiberglass.

Another advantage of the composite construction of the cover 110 is that the panels 119, 123 could be relatively easily replaced.

It is to be understood that while certain forms of the present invention have been illustrated and described herein, it is not to be limited to the specific forms or arrangement of parts described and shown.

What is claimed and desired to be secured by Letters Patent is as follows:

1. A cover, for a trailer having a frame with a front end, a back end, opposite sides, and a post extending generally upwardly at the trailer frame front end, which includes:
    (a) a cover body having:
        (1) an outer shell comprising multiple panels;
        (2) an inner shell comprising multiple panels and generally conforming to said outer shell;
        (3) a rigid framework mounting said outer and inner shell panels;
        (4) a front end associated with the trailer frame front end;
        (5) a back end associated with the trailer frame back end;

(6) opposite sides each associated with a respective trailer frame side;
(7) a generally upwardly-convex configuration defining a downwardly-open interior;
(8) a lower rim; and
(9) a top;
(b) a hinge assembly comprising:
(1) a top strap having proximate and distal ends; said top strap proximate end is fastened to said cover body top;
(2) a front strap having proximate and distal ends; said front strap proximate end is fastened to said cover body front end;
(3) a transverse hinge pin mounted on said top and front strap distal ends in spaced relation from said cover body front end and having opposite ends; and
(4) a pair of plate members each mountable on an upper end of said trailer frame post in parallel, spaced relation, each said plate member having a generally vertical slot receiving each respective hinge pin end; said slot defines a lost motion linkage slot with upper and lower ends;
(c) a pair of jack assemblies each comprising a piston-and-cylinder unit with a lower end connected to each respective trailer frame side and an upper end connected to each cover body side adjacent said lower rim in proximity to said cover body and frame front ends;
(d) a pair of supports each having a lower end connected to each respective trailer frame side adjacent said trailer frame rear end and a bifurcated upper end with a transverse receiver extending therethrough;
(e) each said body cover side having a receiver positioned in closely-spaced relation above said rim and in proximity to said cover body back end;
(f) a raised position and a lowered position; said cover being movable between the raised position with said hinge pin at said lost motion linkage slot upper ends and said cover body back end raised substantially above said trailer frame back end whereby said cover slopes upwardly from front-to-back and the lowered position with said hinge pin at said lost motion linkage slot lower ends and said cover body rim positioned on said support bifurcated ends; and
(g) a pair of locking pins each positionable in respective aligned support and cover body receivers; said support upper end receivers being aligned with respective cover body side receivers with said cover in the lowered positioned thereof.

2. A cover, for a trailer including a frame with front and back ends and opposite sides, which comprise:
(a) a front end associated with said trailer frame front end;
(b) a back end associated with said trailer frame back end;
(c) opposite sides each associated with a respective trailer frame opposite side;
(d) hinge means interconnecting said trailer frame and said cover front ends;
(e) a pair of jack assemblies each connected to a respective trailer frame side and a respective cover side;
(f) a body having a top and a lower rim;
(g) a pair of supports each mountable on a respective side of said trailer frame in proximity to the back end thereof, each said support receivable of said cover body lower rim at a respective cover body side; each said support includes a lower end mountable on a side of said trailer frame and a bifurcated upper end forming a notch;
(h) a pair of fasteners each fastening a respective support to said cover body; and
(i) said cover having a lowered position with said cover lower rim received in said support notches.

3. A hinged cover, which comprises:
(a) a body having:
(1) a front end;
(2) a back end;
(3) opposite sides;
(4) a lower rim;
(5) a downwardly-open interior; and
(6) a top;
(b) hinge means mounted on one of said body ends including a lost motion linkage;
(c) a pair of jacks each connected to a respective body side; and
(d) said hinge means further including:
(1) a top hinge strap having proximate and distal ends; said top hinge straps proximate end extends along and is fastened to said cover body top;
(2) a front hinge strap having proximate and distal ends; said front hinge strap proximate end extends along and is fastened to said cover body front end;
(3) a hinge pin transversely and horizontally mounted on said top and front hinge strap distal ends; and
(4) a first hinge mounting plate including a vertical slot slidably receiving said hinge pin and a second hinge mounting plate positioned in parallel, spaced relation from said first hinge mounting plate; said second hinge mounting plate includes a vertical slot slidably receiving said hinge pin; said first and second hinge mounting plates and said hinge pin cooperate to form said lost motion linkage.

4. A cover with a body having a top and a lower rim, for a trailer including a frame with front and back ends and opposite sides, said cover comprising:
(a) a front end associated with said trailer frame front end;
(b) a back end associated with said trailer frame back end;
(c) opposite sides each associated with said trailer frame back end;
(d) hinge means, including a lost motion linkage, interconnecting said trailer frame and said cover front ends; said hinge ends further includes a hinge strap having proximate and distal ends, a hinge pin mounted transversely on said strap distal end, and a vertical member attachable to said trailer frame front end and having a receiver pivotally receiving said hinge pin; said hinge strap proximate end is fastened to said cover body top;
(e) a pair of jack assemblies each connected to a respective cover side;
(f) each said jack assembly is located in proximity to said trailer frame front end;
(g) said cover further includes a pair of supports each mountable on a respective side of said trailer frame in proximity to the back end thereof, each said support being receivable of said cover body lower rim at a respective cover side, and a pair of fasteners each fastening a respective support to said cover body; each said support includes a lower end mountable on a respective side of said trailer frame and a bifurcated upper end forming a notch; and
(h) said cover having a lowered position thereof with said cover lower rim received in said support notches.

* * * * *